Patented June 24, 1952

2,601,315

UNITED STATES PATENT OFFICE 2,601,315

MANUFACTURE OF POLYVINYL ACETATE EMULSION PAINTS

George O. Morrison, Milltown, N. J., and Daniel Schoenholz, New York, N. Y., assignors to Shawinigan Products Corporation, New York, N. Y., a corporation of New York No Drawing. Application May 3, 1947, Serial No. 745,718

15 Claims. (Cl. 260—29.6)

The present invention relates to the manufacture of polyvinyl acetate emulsion paints, and more particularly to paints of this type containing a dispersed resin component consisting essentially or exclusively of a polyvinyl acetate resin produced by polymerization of vinyl acetate in aqueous suspension.

Our invention relates to the same general type of polyvinyl acetate emulsion paints as are described in the pending application of George O. Morrison entitled "Aqueous Polyvinyl Acetate Emulsion Paints and Method of Preparing Same," Serial No. 707,347, filed November 1, 1946, now U. S. Patent 2,567,678. In such application there is described a procedure for the manufacture of polyvinyl acetate emulsion paints wherein a pigment paste and a keying or adhesion-promoting agent, such as an alkyd resin, are incorporated in a polyvinyl acetate emulsion at an elevated temperature, and after cooling, a conditioning agent is added to the mixture, the entire process being conducted with the use of vigorous agitation. The conditioning agent controls and insures the deposition of a uniform, continuous and stable film under various conditions of humidity and temperature. These conditioning agents, as stated in such application, are in the form of organic materials, and preferably of mixtures of such materials, which as a whole have only a limited solubility in water and have solvent or swelling action on the polyvinyl acetate resin, the function of such conditioning agents being to reverse the original system in which the hydrophilic emulsifier was present in the dispersing phase to one in which such emulsifier becomes part of the dispersed phase, that is, becomes dispersed within the resinous film body formed by the coalescence of the previously dispersed resin particles as the water evaporates.

The general object of the present invention is to improve the properties of the aforementioned type of polyvinyl acetate emulsion paints and also to provide an improved procedure for the manufacture of such paints whereby the use of elevated temperatures is avoided, our improved process being capable of being conducted entirely at substantially room temperature.

We have found that the procedure for the manufacture of polyvinyl acetate emulsion paints of the type described in the above-mentioned Morrison application can be greatly simplified and cheapened by eliminating the use of heat, so that the necessity for specially jacketed kettles, for heating or cooling devices, for steam boilers, and for temperature control apparatus is entirely obviated, while at the same time, by eliminating the heretofore necessary heating and cooling periods, the time for preparing the paint is reduced.

We have found further that the incorporation of wetting agents into the polyvinyl acetate emulsion paints produces a marked over-all improvement in the performance of the paints. In particular, we have found that additions of combinations of a non-ionic and an anionic wetting agent are most effective in imparting a number of improvements to the aqueous emulsion paint. Among these improvements may be mentioned the fact that by the addition of a portion, or of the whole, of the wetting agents used to a water paste of the pigments to be incorporated in the emulsion, during the period in which such paste is being prepared, a smoother paste is obtained, thereby yielding a paint which is capable of depositing a film in which coarse particles are practically completely absent; such an effect being previously unobtainable, at least not without extreme difficulty, with aqueous emulsion paints. A further advantage resulting from the use of our wetting agents arises from the fact that the combination of the anionic and non-ionic wetting agents permits the use of pigments containing slightly soluble polyvalent cations which would precipitate with anionic wetting agents alone. This result is apparently due to the stabilizing and solubilizing effects of the combination of wetting agents in the polyvinyl acetate dispersion. The use of the wetting agents also permits the incorporation of a greater volume per cent of pigment based upon the total volume of non-volatile ingredients in the paint. Thus, according to prior experience, it was found that polyvinyl acetate emulsions having a particle size of 1.5 to 2 microns could tolerate no more than 35% pigment by volume, while emulsions of 0.5 to 1.5 microns could tolerate no more than 38% pigment by volume, greater concentrations of pigment in these emulsions resulting in film failure. We have found that by the use of wetting agents, the emulsions of 1.5 to 2 micron particle size can tolerate 40% pigment volume while the emulsions of 0.5 to 1.5 micron particle size can tolerate 43% pigment by volume. Finally, the use of wetting agents imparts improved paintability in that the paint wets more easily the surfaces to which it is applied, thus aiding both brushability and leveling.

In carrying out our process the several ingredients of the paint mixture are combined in such order that a uniform and stable paint composition is obtained without the application of heat during the process of mixing and without forced cooling at any stage of the process. The paint composition includes an aqueous polyvinyl acetate emulsion which preferably contains the amount of wetting agent necessary or desirable for its preparation; a conditioning agent for the polyvinyl acetate resin, an adhesion-promoting resin, particularly one which improves the adhesion of the aqueous emulsion paint to old paint surfaces, a pigment, and preferably also the added wetting agent referred to above, such wetting agent in its most useful form being composed of a mixture of an anionic and non-ionic wetting agent. The adhesion-promoting resin is preferably separately combined with the conditioning agent, which may consist of a mixture of a solvent and plasticizer for the polyvinyl acetate resin, there being added to such mixture, if desired, a small amount, say 5%, by weight of water, the water being dispersed in the organic mixture of adhesion-promoting resin, solvent, and plasticizer, and this is now added to the polyvinyl acetate dispersion which is subjected to rapid and vigorous agitation, all of these mixings being done at room temperature. In this way we have obtained highly satisfactory dispersion of the resin conditioning agent charge in the polyvinyl acetate emulsion without the aid of heat and without any form of temperature control whatsoever. To this agitated mixture we now add a previously prepared pigment paste with simultaneous vigorous agitation and obtain in this way uniform distribution and suspension of the pigment, so that a paint is formed equivalent in all respects to that prepared with the use of heat as described in the above-mentioned Morrison application.

We have found that by employing the cold-formulation of the aqueous emulsion paint as outlined above, a large variety of alkyd resins can be employed without danger of causing coagulation of the emulsion or brush-fouling in the use of the paint. The greater stability of the mixture is in all likelihood due, at least in large part, to the fact that in subsequent transportation, storage and use, the paint composition is subjected to temperature conditions not critically different from those obtaining during the course of manufacture of the paint.

Our cold-formulation procedure enables also other types of resins than alkyd resins to serve satisfactorily as adhesion-promoting agents for the emulsion paint film to hydrophobic surfaces. We have found that when incorporated in the emulsion paint in the cold-formulation method above described, satisfactory adhesion can be obtained by employing resins of the polyterpene types, coumarone-indene resins, rosin esters, such as pantaerythritol abietate, phenolic resins, and the like, provided that the resin employed is soluble in the cold conditioning agent (swelling agent or solvent-plasticizer mixture). If desired, heat may be employed to speed the solution or blending of a high melting resin in the conditioning agent, but the solution is added cold in compounding the paint. The greater variety of resins, including combinations of resins, which can be employed to improve the adhesion of the paint film in accordance with the present invention offers the advantage that resins may be chosen for certain specific properties, such as hardness, color retention, resistance to oxidation, specific adhesion to certain surfaces, and other physical and chemical properties without undue concern for the possibility of incompatibility in the polyvinyl acetate emulsion paint and consequent coagulation or brush fouling.

As already indicated, we prefer to employ in our cold-formulation process a mixture of anionic and non-ionic wetting agents. The wetting agents that have given best results are di-normal-octyl ester of sodium sulfosuccinate (anionic), known commercially as "Aerosol OT," and a non-ionic oleic acid condensate of polyethylene oxide, known commerically as "Neutronyx 228." Equal amounts of these wetting agents are preferably employed, although the proportions can be varied considerably. We prefer to employ no more than about 0.35% of the mixture of wetting agents based on the total weight of polyvinyl acetate emulsion paint, as larger amounts of wetting agents tend to decrease the scrubability or resistance to washing of the resulting paint film. The wetting agents can be added at any stage in the compounding of the paint, but we prefer to employ at least part in making up the pigment paste. The wetting agent is employed in addition to that which is already contained in the aqueous polyvinyl acetate emulsion itself, wherein the maximum content is 0.3% based on the weight of the emulsion, and which in the paint becomes diluted to about 0.105%, so that the total wetting agent content is more than 0.105% but no more than 0.455% of the total paint. Our investigations have shown that a superior pigment paste is obtained if the pigment is ground in water containing the wetting agent in a ball mill, although other grinding apparatus can be employed. However, in the ball mill a finer suspension of the pigment in the liquid can generally be obtained, and the use of such grinding apparatus is accordingly preferred.

Instead of manufacturing the complete aqueous emulsion paint, it is possible to prepare only a paint base or vehicle, to be sold as such to paint manufacturers who prefer to incorporate their own pigments in the vehicle. Such paint base or vehicle can be prepared as above described by mixing the aqueous polyvinyl acetate dispersion, under vigorous agitation, with a previously prepared mixture of an adhesion-promoting resin, like an alkyd resin, pentaerythritol abietate, and other adhesion-improving agents compatible with the polyvinyl acetate resin, with a conditioning agent or agents for such resin, such mixture preferably having mechanically dispersed therein a small proportion, for example, 5%, of water, mixing being carried out at temperatures not substantially higher than about 30° C. To this stable emulsion, in which there may be included a wetting agent, preferably the mixture of non-ionic and anionic wetting agents above described, there can subsequently be added a fine aqueous dispersion of the pigment, such dispersion preferably containing also at least part of the total wetting agent of the final aqueous emulsion paint.

While in the foregoing we have indicated that the use of additional wetting agents, over and above that which may be employed in the manufacture of the original polyvinyl acetate emulsion, is preferred, such additional wetting agents are not absolutely necessary, as an aqueous emulsion paint can be prepared in the cold without their aid which is satisfactory for many purposes.

The following examples illustrate successful methods and formulae for carrying out the invention but it will be understood that they are presented for purposes of illustration only and not as indicating the limits of the invention:

EXAMPLE 1

Part A

| | Parts by weight |
|---|---|
| Polyvinyl acetate emulsion (50% solids) | 500 |

Part B

| | |
|---|---|
| Di-n-octyl sodium sulfosuccinate | 1 |
| Oleic acid condensate of polyethylene oxide | 1 |
| Water | 18 |

Part C

| | |
|---|---|
| Ethyl acetate | 60 |
| Dibutyl phthalate | 25 |
| Pentaerythritol abietate | 25 |
| Water | 5 |

Part D

| | |
|---|---|
| Titanium dioxide | 275 |
| Waterground mica, 325 mesh | 30 |
| Micronized mica | 30 |
| Domestic China clay | 30 |
| Diatomaceous earth | 35 |
| Di-n-octyl sodium sulfosuccinate | 1 |
| Oleic acid condensate of polyethylene oxide | 1 |
| Water | 395 |

In preparing the aqueous emulsion paint, the polyvinyl acetate dispersion is placed in any suitable container equipped with an agitator and is rapidly stirred. As already indicated, the aqueous polyvinyl acetate dispersion or emulsion is of the type disclosed in the above-mentioned application wherein the maximum average particle size is 5 microns, the smaller size particles being preferred. Part B which represents half of the added wetting agent charge, is utilized at a 10% solution to insure uniform distribution of the wetting agents. Part C is prepared by heating the solvent-plasticizer mixture so as to facilitate solution of the resin, and after the resin has been dissolved therein, the solution is allowed to cool to approximately room temperature. The small amount of water is stirred into the solution until it becomes mechanically dispersed therein. This dispersion is then added to the mixture of parts A and B while the stirring is continued. Part D, which contains the remaining wetting agent charge as well as the pigments and fillers, is mixed with the indicated amount of water in a ball mill or other suitable apparatus and is added as a smooth thin paste. The agitation of the whole mixture is continued until a uniform aqueous dispersion is obtained.

As indicated above, we prefer to dissolve the adhesion-promoting agent in a mixture of both the solvent and plasticizer for the polyvinyl acetate (part C). It is, however, possible to dissolve the adhesion-promoting resin in only one of these materials, the other being employed in part B or directly in part A.

The following example illustrates a formula in which no added wetting agents are employed:

EXAMPLE 2

Part A

| | Parts by weight |
|---|---|
| Polyvinyl acetate emulsion (50% solids) | 500 |

Part B

| | |
|---|---|
| Ethyl acetate | 50 |
| Dibutyl phthalate | 25 |
| Alkyd resin (rezyl 869) | 25 |
| Water | 5 |

Part C

| | Parts by weight |
|---|---|
| Titanium dioxide | 275 |
| Waterground mica, 325 mesh | 30 |
| Micronized mica | 30 |
| Domestic China clay | 30 |
| Diatomaceous earth | 35 |
| Water | 475 |

The manner of compounding these materials is similar to that set out under Example 1. Part B is prepared by dissolving the resin in the solvent-plasticizer mixture after which the small amount of water is stirred in so as to form a temporary dispersion, which is then added to part A under agitation. Part C is separately worked up in a ball mill or other grinding apparatus and is added as a smooth thin paste to the stirred mixture of parts A and B.

It will be understood that the pigments and fillers should be of such type that they will not react with any of the other ingredients of the mixture and will be compatible with the polyvinyl acetate dispersion. Strongly basic pigments are generally undesirable, although small amounts of zinc oxide can be used with the titanium dioxide.

We claim:

1. Process for the manufacture of polyvinyl acetate emulsion paints characterized by good paintability, brushability, leveling, covering power, and adhesion to old oil paint surfaces, which comprises vigorously agitating a polyvinyl acetate emulsion prepared by polymerization of vinyl acetate in aqueous suspension and having a maximum average particle size of 5 microns, and mixing therewith, without the application of heat, a wetting agent, a previously prepared mixture of an adhesion-promoting resin and a solvent and plasticizer for the polyvinyl acetate and a previously prepared uniform paste containing pigment material, a wetting agent, and water.

2. Process for the manufacture of polyvinyl acetate emulsion paints characterized by good paintability, brushability, leveling, covering power, and adhesion to old oil paint surfaces, which comprises vigorously agitating a polyvinyl acetate emulsion prepared by polymerization of vinyl acetate in aqueous suspension and having a maximum average particles size of 5 microns and containing a wetting agent, and mixing therewith, without the aid of applied heat, a conditioning agent for the polyvinyl acetate resin, an adhesion-promoting resin, an aqueous pigment paste, and an added quantity of a wetting agent to bring the total content of wetting agent to no more than about 0.455% of the total paint composition, and continuing the mixing until a uniform dispersion is obtained.

3. Process according to claim 2, wherein the wetting agent includes both an anionic and a non-ionic wetting agent.

4. Process according to claim 2, wherein the conditioning agent comprises a solvent and a plasticizer for the polyvinyl acetate.

5. Process for the manufacture of polyvinyl acetate emulsion paints characterized by good paintability, brushability, leveling, covering power, and adhesion to old oil paint surfaces, which comprises vigorously agitating a polyvinyl acetate emulsion prepared by polymerization of vinyl acetate in aqueous suspension and having a maximum average particle size of 5 microns and containing a wetting agent, adding thereto, during the agitation, a mixture of a solvent and a plasticizer for the polyvinyl acetate, and an adhesion promoting resin, said mixture of solvent, plasticizer and resin having added water dispersed therein, adding to the agitated combined mixture, at room temperature, an aqueous paste of a pigment containing also a wetting agent, and continuing the agitation until a uniform dispersion is obtained, there being no heat applied to the agitated mass during the course of mixing, and the total content of wetting agent being no more than about 0.455% of the total composition.

6. Process according to claim 2, wherein the wetting agent includes a di-N-octyl sulfosuccinate and an oleic acid condensate of polyethylene oxide.

7. Process according to claim 2, wherein the aqueous pigment paste contains added wetting agent.

8. Process according to claim 2, wherein the pigment paste contains a mixture of approximately equal parts of di-N-octyl sulfosuccinate and an oleic acid condensate of polyethylene oxide.

9. Process according to claim 2, wherein the pigment paste is prepared by grinding the pigment in water containing added wetting agent.

10. Process according to claim 2, wherein the adhesion-promoting resin is an alkyd resin.

11. Process according to claim 2, wherein the adhesion-promoting resin is pentaerythritol abietate.

12. Process for the manufacture of aqueous polyvinyl acetate emulsion paint bases characterized, upon suspension of a pigment therein, by good paintability, brushability, leveling, covering power, and adhesion to old oil paint surfaces, which comprises mixing with an aqueous polyvinyl acetate emulsion prepared by polymerization of vinyl acetate in aqueous suspension and having a maximum average particle size of 5 microns and containing a wetting agent, at a maximum temperature of about 30° C., a previously prepared mixture of an adhesion-promoting resin which is compatible with the polyvinyl acetate, an organic solvent and a plasticizer for the polyvinyl acetate, and water, the water being dispersed in the mixture of organic materials, and an added quantity of wetting agent, the total content of wetting agent being such that in the ultimate emulsion paint it constitutes no more than about 0.455% of the whole paint composition.

13. Process for the manufacture of aqueous polyvinyl acetate emulsion paint bases characterized, upon suspension of a pigment therein, by good paintability, brushability, leveling, covering power, and adhesion to old oil paint surfaces, which comprises mixing an aqueous polyvinyl acetate emulsion prepared by polymerization of vinyl acetate in aqueous suspension and having a maximum average particle size of 5 microns and containing a wetting agent, at a maximum temperature of about 30° C. with a separately prepared mixture of an adhesion-promoting resin which is compatible with the polyvinyl acetate, water, an organic conditioning agent having a low solubility in water, and having at least a swelling action on the polyvinyl acetate, and an added quantity of wetting agent, the total content of wetting agent being such that in the ultimate emulsoin paint it constitutes no more than about 0.455% of the whole paint composition.

14. Process for the manufacture of aqueous polyvinyl acetate emulsion paints characterized by good paintability, brushability, leveling, covering power, and adhesion to old oil paint surfaces, which comprises mixing an aqueous polyvinyl acetate emulsion prepared by polymerization of vinyl acetate in aqueous suspension and having a maximum average particle size of 5 microns and containing a wetting agent, at a maximum temperature of about 30° C., with an adhesion-promoting resin which is compatible with the polyvinyl acetate, and with an added quantity of wetting agent, the total content of the wetting agent being no more than about 0.455% of the whole paint composition.

15. An aqueous polyvinyl acetate emulsion paint characterized by good paintability, brushability, leveling, covering power, and adhesion to old oil paint surfaces, said paint containing a polyvinyl acetate emulsion prepared by polymerization of vinyl acetate in aqueous suspension and having a maximum average particle size of 5 microns, said paint having suspended therein an adhesion-promoting resin and containing a wetting agent in excess of 0.105% but no more than about 0.455%, based upon the whole paint composition.

GEORGE O. MORRISON.
DANIEL SCHOENHOLZ.

REFERENCES CITED

The following references are of record in the file of this patent:

UNITED STATES PATENTS

| Number | Name | Date |
|---|---|---|
| 2,275,991 | Powers et al. | Mar. 10, 1942 |
| 2,316,629 | Schmetz | Apr. 13, 1943 |
| 2,412,592 | Maier | Dec. 17, 1946 |
| 2,444,396 | Collins et al. | June 29, 1948 |

OTHER REFERENCES

Ind. and Eng. Chem. vol. 35, No. 1, Jan. 1943, pp. 126–128.

Ind. and Eng. Chem. January 1943, pages 126 and 130.